United States Patent
Lee et al.

(10) Patent No.: US 10,198,824 B2
(45) Date of Patent: Feb. 5, 2019

(54) POSE ESTIMATION METHOD AND APPARATUS

(71) Applicant: SAMSUNG ELECTRONICS CO., LTD., Suwon-si (KR)

(72) Inventors: Kyoobin Lee, Seoul (KR); Eric Hyunsurk Ryu, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 15/079,212

(22) Filed: Mar. 24, 2016

(65) Prior Publication Data
US 2017/0132794 A1    May 11, 2017

(30) Foreign Application Priority Data

Nov. 5, 2015  (KR) .......................... 10-2015-0155243

(51) Int. Cl.
*G06K 9/00* (2006.01)
*G06T 7/20* (2017.01)
*H04N 7/18* (2006.01)

(52) U.S. Cl.
CPC .............. *G06T 7/20* (2013.01); *H04N 7/188* (2013.01); *G06T 2207/30244* (2013.01)

(58) Field of Classification Search
None
See application file for complete search history.

(56) References Cited

U.S. PATENT DOCUMENTS

| 6,686,954 B1 * | 2/2004 | Kitaguchi | H04N 5/2253 348/208.1 |
| 7,432,496 B1 * | 10/2008 | Nahum | G01D 5/34707 250/208.1 |
| 7,558,689 B2 * | 7/2009 | Anabuki | G01S 5/16 382/106 |
| 8,249,393 B2 * | 8/2012 | Nakamura | G06T 7/80 382/106 |
| 8,694,051 B2 | 4/2014 | Kulik | |

(Continued)

FOREIGN PATENT DOCUMENTS

JP  2013-092407 A  5/2013
KR  10-2005-0044967 A  5/2005

(Continued)

OTHER PUBLICATIONS

Valenti, et al., "Autonomous Quadrotor Flight Using Onboard RGB-D Visual Odometry", 2014 IEEE International Conference on Robotics & Automation (ICRA), May 31-Jun. 7, 2014. Hong Kong, China, pp. 5233-5238.

*Primary Examiner* — Avinash Yentrapati
(74) *Attorney, Agent, or Firm* — Sughrue Mion, PLLC

(57) ABSTRACT

A pose estimation method and apparatus are provided. The method includes determining, as a rotation component, an output value of a motion sensor configured to sense a motion of the pose estimation apparatus, determining a change amount of a translation component based on the rotation component, and the translation component extracted from images photographed by a vision sensor included in the pose estimation apparatus, optimizing the translation component based on the change amount, and outputting the rotation component and the optimized translation components a pose estimation value of the pose estimation apparatus.

18 Claims, 6 Drawing Sheets

(56) References Cited

U.S. PATENT DOCUMENTS

| | | | |
|---|---|---|---|
| 9,417,689 B1 * | 8/2016 | Ramaswamy | G06F 3/01 |
| 2005/0069174 A1 * | 3/2005 | Uchiyama | G06T 7/74 |
| | | | 382/103 |
| 2005/0125108 A1 * | 6/2005 | Kwon | G01C 17/38 |
| | | | 701/1 |
| 2005/0207671 A1 * | 9/2005 | Saito | G06K 9/3283 |
| | | | 382/275 |
| 2006/0044268 A1 * | 3/2006 | Robin | G06F 1/1626 |
| | | | 345/158 |
| 2007/0297695 A1 * | 12/2007 | Aratani | G06K 9/3216 |
| | | | 382/284 |
| 2009/0022369 A1 * | 1/2009 | Satoh | G01B 21/04 |
| | | | 382/106 |
| 2010/0214118 A1 | 8/2010 | Losee et al. | |
| 2011/0201362 A1 * | 8/2011 | Bregman-Amitai | |
| | | | G06T 19/006 |
| | | | 455/466 |
| 2012/0155775 A1 * | 6/2012 | Ahn | G06T 7/0042 |
| | | | 382/195 |
| 2013/0245984 A1 | 9/2013 | Sheng | |
| 2014/0003661 A1 * | 1/2014 | Kwon | H04N 5/23293 |
| | | | 382/103 |
| 2014/0300732 A1 | 10/2014 | Friend et al. | |
| 2014/0303643 A1 * | 10/2014 | Ha | A61B 34/30 |
| | | | 606/130 |
| 2015/0235378 A1 * | 8/2015 | Rhee | G06T 19/006 |
| | | | 345/633 |
| 2016/0150158 A1 * | 5/2016 | Hasan | H04N 5/23258 |
| | | | 348/208.2 |

FOREIGN PATENT DOCUMENTS

| | | |
|---|---|---|
| KR | 10-2013-0002663 A | 1/2013 |
| KR | 10-2013-0130283 A | 12/2013 |
| KR | 10-1348855 B1 | 1/2014 |

* cited by examiner

POSE ESTIMATION METHOD AND APPARATUS

CROSS-REFERENCE TO RELATED APPLICATION

This application claims priority from Korean Patent Application No. 10-2015-0155243, filed on Nov. 5, 2015, in the Korean Intellectual Property Office, the disclosure of which is incorporated by reference herein in its entirety.

BACKGROUND

1. Field

Methods and apparatuses consistent with exemplary embodiments relate to a method and apparatus for estimating a pose.

2. Description of the Related Art

A pose estimation of a camera may determine translation and rotation information on a dynamically changing camera viewpoint. The pose estimation of a camera may be increasingly utilized in fields of simultaneous localization and map building (SLAM), mixed reality, augmented reality, robot navigating, and three-dimensional (3D) scene reconstruction.

SUMMARY

According to an aspect of an exemplary embodiment, there is provided a pose estimation method performed by a pose estimation apparatus, the method comprising determining, as a rotation component, an output value of a motion sensor configured to sense a motion of the pose estimation apparatus; determining a change amount of a translation component based on the rotation component, and the translation component extracted from images photographed by a vision sensor included in the pose estimation apparatus, and optimizing the translation component based on the change amount; and outputting the rotation component and the optimized translation component as a pose estimation value of the pose estimation apparatus.

The output value of the motion sensor may comprise motion information on a rotation angle of the pose estimation apparatus.

The rotation component may be constantly maintained to be the output value of the motion sensor while the translation component is optimized.

A change amount of the rotation component may be set to be 0, or a rotation component of a Jacobian matrix used to determine the change amount of the translation component may be set to be 0.

The optimizing of the translation component may comprise determining the change amount of the translation component based on the rotation component and the translation component in a previous operation, and determining a translation component in a current operation from the translation component in the previous operation based on the change amount of the translation component; verifying whether additional optimization with respect to the translation component in the current operation is requested; and determining the translation component in the current operation as the optimized translation component when the additional optimization with respect to the translation component in the current operation is not requested.

The verifying may comprise verifying that the additional optimization is not requested when the change amount of the translation component is less than a threshold amount, or when an error rate in the current operation is greater than an error rate in the previous operation.

The method may further comprise determining the output pose estimation value, and determining a fusion pose estimation value of the pose estimation apparatus by applying a sensor fusion scheme with respect to the pose estimation value of the pose estimation apparatus determined based on motion information on the motion of the pose estimation apparatus output from the motion sensor.

The determining of the output value of the motion sensor as the rotation component may comprise verifying whether the output value of the motion sensor is determined as the rotation component based on at least one of a reliability of the output value of the motion sensor, whether the output value of the motion sensor exists, and an initialization condition of the motion sensor.

The vision sensor may be an event-based vision sensor configured to asynchronously generate an event signal in response to an event in which a light received from an object is changed; or a frame-based vision sensor configured to synchronously photograph the object according to a number of frames per second.

The translation component may comprise information on a translation distance of the pose estimation apparatus based on an x-axis, a y-axis, and a z-axis, and the rotation component comprises information on a rotation angle of the pose estimation apparatus based on the x-axis, the y-axis, and the z-axis.

According to another aspect of an exemplary embodiment, there is provided a non-transitory computer-readable recording medium which stores a program to implement a method comprising determining, as a rotation component, an output value of a motion sensor configured to sense a motion of the pose estimation apparatus; determining a change amount of a translation component based on the rotation component, and the translation component extracted from images photographed by a vision sensor included in the pose estimation apparatus, and optimizing the translation component based on the change amount; and outputting the rotation component and the optimized translation component as a pose estimation value of the pose estimation apparatus.

According to another aspect of an exemplary embodiment, there is provided a pose estimation apparatus comprising a motion sensor configured to sense a motion of the pose estimation apparatus; a vision sensor configured to photograph a foreground of the pose estimation apparatus; and a processor configured to estimate a pose of the pose estimation apparatus, wherein the processor is configured to determine, as a rotation component, an output value of the motion sensor, determine a change amount of a translation component based on the rotation component, and the translation component extracted from images photographed by the vision sensor, optimize the translation component based on the change mount, and output the rotation component and the optimized translation component as a pose estimation value of the pose estimation apparatus.

The output value of the motion sensor may comprise motion information on a rotation angle of the pose estimation apparatus.

The rotation component may be constantly maintained to be the output value of the motion sensor while the translation component is optimized.

The processor may be configured to determine the change amount of the translation component based on the rotation component and a translation component in a previous operation, determine a translation component in a current operation from the translation component in the previous operation, verify whether additional optimization with respect to the translation component in the current operation is requested, and determine the translation component in the current operation as the optimized translation component when the additional optimization with respect to the translation component is not requested.

The processor may be configured to verify that the additional optimization is not requested when the change amount of the translation component is less than a threshold amount, or when an error rate in the current operation is greater than an error rate in the previous operation.

The processor may be configured to determine the output pose estimation value and a fusion pose estimation value of the pose estimation apparatus by applying a sensor fusion scheme with respect to the pose estimation value of the pose estimation apparatus determined based on motion information on the motion of the pose estimation apparatus output from the motion sensor.

The processor may be configured to verify whether the output value of the motion sensor is determined as the rotation component based on at least one of a reliability of the output value of the motion sensor, whether the output value of the motion sensor exists, and an initialization condition of the motion sensor.

The vision sensor may be an event-based vision sensor configured to asynchronously generate an event signal in response to an event in which a light received from an object is changed; or a frame-based vision sensor configured to synchronously photograph the object according to a predetermined number of frames per second.

The translation component may comprise information on a translation distance of the pose estimation apparatus based on an x-axis, a y-axis, and a z-axis, and the rotation component comprises information on a rotation angle of the pose estimation apparatus based on the x-axis, the y-axis, and the z-axis.

According to another aspect of an exemplary embodiment, there is provided a pose estimation method performed by a pose estimation apparatus, the method comprising in a first stage, setting a rotation angle from a motion sensor of the pose estimation apparatus, as a rotation component of a pose of the pose estimation apparatus, and determining a change amount of a plurality of images from a vision sensor of the pose estimation apparatus, as a translation component of a pose of the pose estimation apparatus; in one or more subsequent stages, iteratively optimizing the translation component based on a translation component from a prior stage, while holding a change amount of the rotation component constant; and outputting the rotation component and the optimized translation component of the pose of the pose estimation apparatus.

The constant may be 0.

The translation component may be iteratively optimized until a termination condition for the optimization is reached.

The termination condition may occur when a change amount of the translation component is less than a threshold amount or when an error rate with respect to the translation component and a rotation component determined in a current stage is greater than an error rate with respect to the translation component and a rotation component in a prior stage.

The translation component may be a degree of movement of the pose estimation apparatus with respect to an x axis, a y axis, and a z axis, and the rotation component may be a degree of rotation of the pose estimation apparatus with respect to the x axis, the y axis and the z axis.

BRIEF DESCRIPTION OF THE DRAWINGS

The above and other aspects will become apparent and more readily appreciated from the following detailed description of certain exemplary embodiments, taken in conjunction with the accompanying drawings of which.

DETAILED DESCRIPTION

Figure 1:
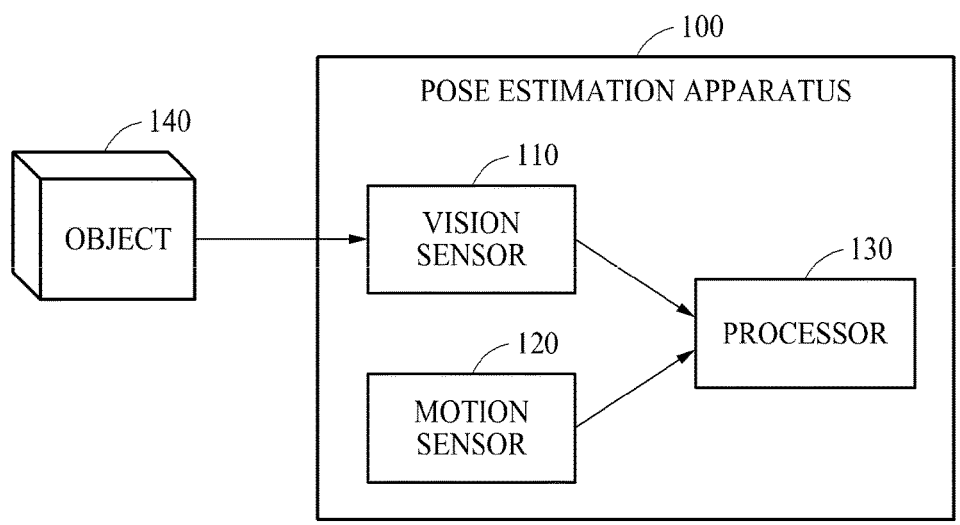
FIG. 1 illustrates an example of a pose estimation apparatus according to an exemplary embodiment.

Hereinafter, some exemplary embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of exemplary embodiments, detailed description of well-known related structures or functions will be omitted when it is deemed that such description will cause ambiguous interpretation of the present disclosure.

It should be understood, however, that there is no intent to limit this disclosure to the particular exemplary embodiments disclosed. On the contrary, exemplary embodiments are to cover all modifications, equivalents, and alternatives falling within the scope of the exemplary embodiments. Like numbers refer to like elements throughout the description of the figures.

In addition, terms such as first, second, A, B, (a), (b), and the like may be used herein to describe components. Each of these terms is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular exemplary embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two operations shown in succession may in fact be executed substantially concurrently or may sometimes be executed in the reverse order, depending upon the functionality/acts involved.

Various exemplary embodiments will now be described more fully with reference to the accompanying drawings in which some exemplary embodiments are shown. In the drawings, the thicknesses of layers and regions are exaggerated for clarity.

Exemplary embodiments to be described hereinafter may be provided in various forms of products including, for example, a smartphone, a mobile device, a wearable device, a personal computer (PC), a laptop computer, a tablet computer, an intelligent vehicle, a television (TV), a smart home appliance, an autonomous vehicle, a robot, and the like. For example, exemplary embodiments may be applied to estimate a pose of a product such as a smartphone, a mobile device, a wearable device, an autonomous vehicle, a robot, and the like. Exemplary embodiments may be applicable to various services using pose estimation. For example, exemplary embodiments may be applicable to services providing information on an object or a gaze direction of a user by estimating a pose of a wearable device worn by the user.

FIG. 1 illustrates an example of a pose estimation apparatus according to an exemplary embodiment.

Referring to FIG. 1, a pose estimation apparatus 100 includes a vision sensor 110, a motion sensor 120, and a processor 130. For example, the pose estimation apparatus 100 may be implemented with a single processor or multiple processors. The processor may be a microprocessor, a microcontroller, or a central processing unit (CPU). Alternatively, the pose estimation apparatus 100 may be implemented by a plurality of modules included in different apparatuses. In such a case, the plurality of modules may be connected through a network and the like. The pose estimation apparatus 100 may be equipped in various systems and/or computing devices, for example, a smartphone, a mobile device, a wearable device, a PC, a laptop computer, a tablet computer, an intelligent vehicle, a TV, a smart home appliance, an autonomous vehicle, a robot, and the like.

The vision sensor 110 may photograph a foreground of the pose estimation apparatus 100. For example, an object 140 may be positioned in the foreground of the pose estimate apparatus 100, and the vision sensor 110 may generate an image by photographing the object 140 positioned in front of the pose estimation apparatus 100.

For example, the vision sensor 110 may be any one of (i) an event-based vision sensor to asynchronously generate an event signal in response to an event in which a light received from the object 140 is changed and (ii) a frame-based vision sensor to synchronously photograph the object 140 according to a number of frames per second. The number of frames per second may be predetermined. The event-based vision sensor may include a dynamic vision sensor (DVS). The frame-based vision sensor may include a CMOS image sensor (CIS).

The motion sensor 120 may generate motion information by sensing a motion of the pose estimation apparatus 100. For example, the motion sensor 120 may be a 9-axis sensor including an inertial measurement unit (IMU) and a terrestrial magnetism sensor and may output the motion information on a rotation angle of the pose estimation apparatus 100. Alternatively, the motion sensor 120 may be an attitude and heading reference system (AHRS).

The processor 130 may estimate a pose of the pose estimation apparatus 100. The processor 130 may determine an output value of the motion sensor 120 as a rotation component, determine a change amount of a translation component, based on the rotation component and the translation component extracted from images photographed by the vision sensor, optimize the translation component based on the change amount, and output the rotation component and the optimized translation component as a pose estimation value.

Figure 2:
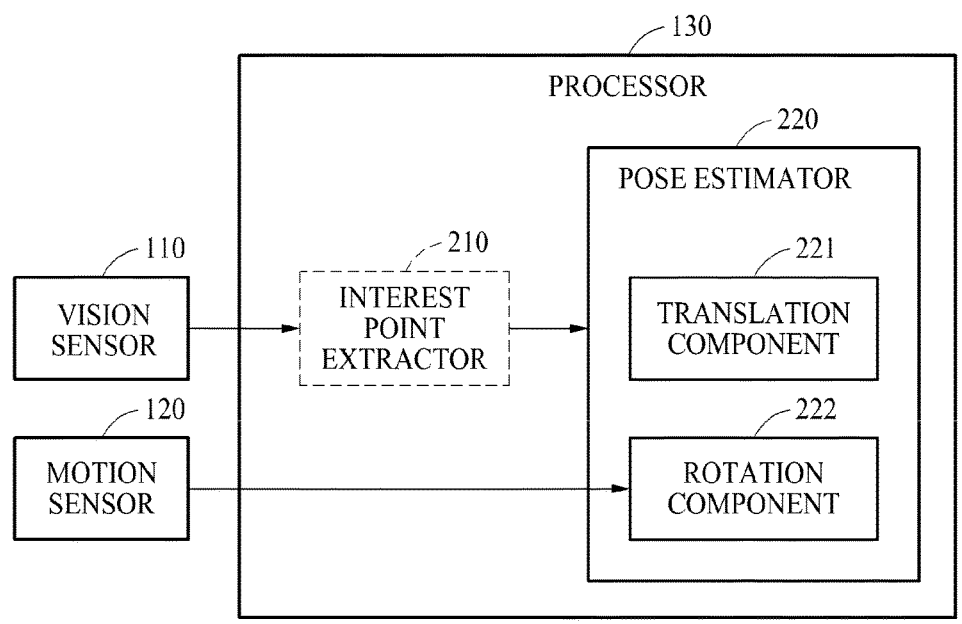
FIG. 2 illustrates an example of estimating a pose according to an exemplary embodiment.
Figure 8:
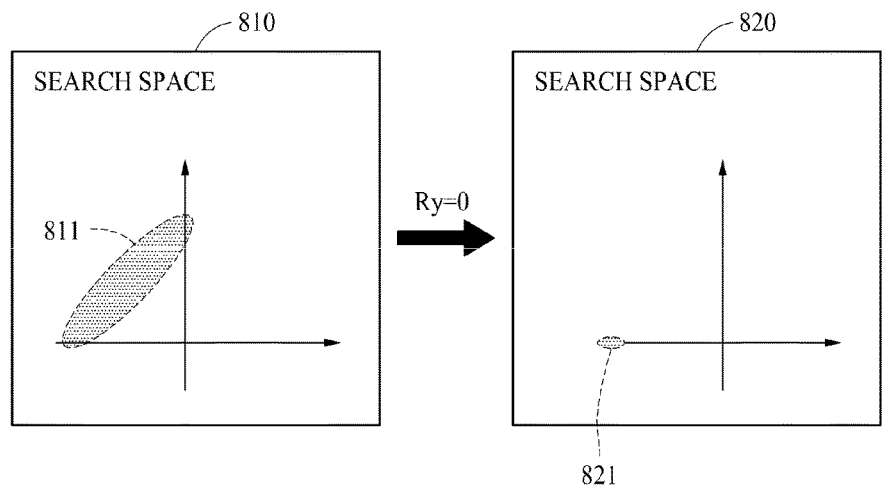
FIG. 8 illustrates an example of optimizing a translation component based on a search space according to an exemplary embodiment.

Detailed descriptions of a process of estimating the pose of the pose estimation apparatus 100 by the processor 130 will be provided with reference to FIGS. 2 and 8.

FIG. 2 illustrates an example of estimating a pose according to an exemplary embodiment.

Referring to FIG. 2, the processor 130 includes an interest point extractor 210 and a pose estimator 220.

The interest point extractor 210 may extract an interest point from an image received from the vision sensor 110. The interest point may be a point indicating a feature included in the image received from the vision sensor 110. The interest point extractor 210 may extract the interest point from the image based on a method used in a corresponding technical field. In some exemplary embodiments, the interest point extractor 210 may be omitted from the processor 130.

The pose estimator 220 may determine a pose estimation value indicating a pose of the pose estimation apparatus 100. The pose estimation value may indicate the pose of the pose estimation apparatus 100 based on a translation component 221 and a rotation component 222. The translation component 221 may include information on a degree of movement, for example, a translation distance, of the pose estimation apparatus 100 based on each of an x-axis, a y-axis, and a z-axis. The rotation component 222 may include information on a degree of rotation, for example, a rotation angle, of the pose estimation apparatus 100 based on each of the x-axis, the y-axis, and the z-axis.

The pose estimator 220 may determine an output value of the motion sensor 120 as the rotation component 222. The pose estimator 220 may determine, as the rotation component 222, motion information on the rotation angle of the pose estimation apparatus 100 output from the motion sensor 120.

The pose estimator 220 may determine the translation component 221 indicating the translation distance of the pose estimation apparatus 100 by optimizing the translation component 221. The optimization of the translation component 221 may be performed as follows.

The pose estimator 220 may extract an initial translation component from images received from the vision sensor 110. The pose estimator 220 may determine a change amount of the translation component 221 based on the initial translation component and the rotation component 222, and determine a translation component in a next operation from the initial translation component based on the determined change amount of the translation component 221.

Similarly, the pose estimator 220 may determine a translation component in a following operation based on the rotation component 222 and the translation component in the next operation. The pose estimator 220 may determine an optimized translation component by iteratively performing the aforementioned process until the optimization with respect to the translation component 221 terminates.

The pose estimator 220 may optimize the translation component 221 by determining a conversion ξ minimizing a photometric error as shown in Equation 1.

$$E(\xi) = \sum_i r_i(\xi)^2 = \sum_i (I_{t-1}(p_i) - I(f(p_i, \xi)))^2 \quad \text{[Equation 1]}$$

In Equation 1, E denotes the photometric error expressed to be a square of an error $r_i$, and the conversion ξ denotes a conversion occurring due to a motion of the pose estimation apparatus 100. $r_i$ denotes an error corresponding to $P_i$, I denotes a pixel value, for example, a pixel brightness, $P_i$ denotes an $i^{th}$ pixel position, and $f(p_i, \xi)$ denotes a pixel position at which $P_i$ is converted by the conversion ξ. Thus, $r_i$ may be expressed to be a square with respect to a difference between a pixel value of $P_i$ before $P_i$ is converted and a pixel value of $f(p_i, \xi)$ after $P_i$ is converted. When the conversion ξ according to the motion of the pose estimation apparatus 100 is detected with a high degree of accuracy, a magnitude of $r_i$ may decrease and E may have a minimum value.

For example, the pose estimator 220 may determine the conversion ξ minimizing the photometric error based on a Gauss-Newton method or a gradient descent method. In this example, the conversion ξ may be determined based on the Gauss-Newton method as follows.

$$\delta\xi = (J^TJ)^{-1}J^Tr(\xi)$$

In Equation 2, δξ denotes a change amount of the conversion ξ and includes a change amount of a translation component 221 and a change amount of the rotation component 222. J denotes a Jacobian matrix of an error r= $(r_1, \ldots, r_i)$.

The pose estimator 220 may constantly maintain the rotation component 222 as the output value of the motion sensor 120 while the translation component 221 is optimized by determining the conversion minimizing the photometric error based on Equation 1 and Equation 2. Thus, the pose estimator 220 may set the change amount of the rotation component 222 included in δξ to be 0, or set the rotation component 222 of the Jacobian matrix J to be 0.

When the optimization with respect to the translation component 221 terminates, the pose estimator 220 may output the optimized translation component 221 and the rotation component 222 as the pose estimation value of the pose estimation apparatus 100.

Figure 3:
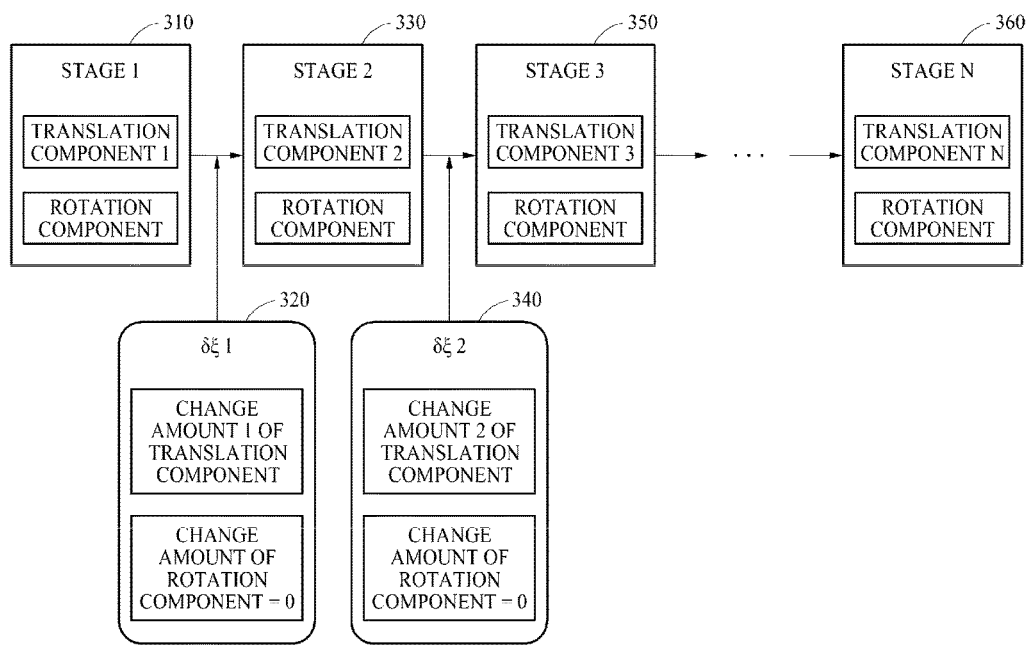
FIG. 3 illustrates an example of optimizing a translation component according to an exemplary embodiment.

FIG. 3 illustrates an example of optimizing a translation component according to an exemplary embodiment.

A pose estimation apparatus may determine the conversion ξ minimizing a photometric error using optimization problems. The pose estimation apparatus may optimize a translation component through the aforementioned process.

In operation 310, the pose estimation apparatus may determine the initial conversion ξ including an initial translation component and an initial rotation component. Hereinafter, operation 310 is also referred to as stage 1. The pose estimation apparatus may extract the initial translation component from images photographed by a vision sensor and determine an output value of a motion sensor as the initial rotation component. The initial translation component determined by the pose estimation component in FIG. 3 is referred to as a component 1, and the initial rotation component is referred to as a rotation component.

The pose estimation apparatus may determine δξ 1 320 based on the rotation component and the translation component 1 determined in operation 310. For example, the pose estimation apparatus may determine a change amount 1 of the translation component included in the δξ 1 320 from the rotation component and the translation component 1 in operation 310 based on a Gauss-Newton method. In such a case, the pose estimation apparatus may determine a change amount of the rotation component to be 0 regardless of the translation component 1 and the rotation component in operation 310, in order that a value of the rotation component in operation 310 is not changed.

In operation 330, the pose estimation apparatus may determine a translation component 2 and the rotation component by applying the δξ 1 320 to the translation component 1 and the rotation component in operation 310. Hereinafter, operation 330 is also referred to as stage 2. For example, the translation component 2 in operation 330 may be determined based on a sum of the translation component 1 in operation 310 and the change amount 1 of the translation component included in the δξ 1 320. In this example, since the change amount 1 of the rotation component included in the δξ 320 is 0, the rotation component in operation 330 may be identical to the rotation component in operation 310.

The pose estimation apparatus may determine δξ 2 340 based on the translation component 2 and the rotation component in operation 330. For example, the pose estimation apparatus may determine a change amount 2 of the translation component included in the δξ 2 340 from the translation component 2 and the rotation component based on the Gauss-Newton method. In such a case, the pose estimation apparatus may determine the change amount of the rotation amount to be 0 regardless of the translation component 2 and the rotation component in operation 330 in order that the value of the rotation component in operation 330 is constantly maintained.

In operation 350, the pose estimation apparatus may determine a translation component 3 and the rotation component by applying the δξ 2 340 to the translation component 2 and the rotation component in operation 330. Hereinafter, operation 350 is also referred to as stage 3. For example, the translation component 3 in operation 350 may be determined based on a sum of the change amount 2 of the translation component included in the δξ 2 340 and the translation component 2 in operation 330. In such a case, since the change amount of the rotation component included in the δξ 2 340 is 0, the rotation component in operation 350 may be identical to the rotation component in operation 330.

Concisely, the pose estimation apparatus may determine a change amount of a translation component based on a rotation component and a translation component in a previous operation, and determine a translation component in a current operation from the translation component based on the determined change amount of the translation component.

When the translation component in the current operation is determined from the translation component in the previous operation based on the change amount of the translation component, the pose estimation component may verify whether an additional optimization with respect to the translation component in the current operation is requested.

For example, when the determined change amount of the translation component is less than a threshold size and/or when an error rate with respect to the translation component and a rotation component determined in the current operation is greater than an error rate with respect to the translation component and a rotation component in the previous operation, the pose estimation apparatus may verify that the additional optimization with respect to the translation component in the current operation is not requested. The threshold size may be predetermined.

When the determined change amount of the translation component is not less than the threshold size and/or when the error rate with respect to the translation component and the rotation component determined in the current operation is not greater than the error rate with respect to the translation component and the rotation component in the previous operation, the pose estimation apparatus may verify that the additional optimization with respect to the translation component in the current operation is requested, thereby continuously performing the optimization with respect to the translation component.

In operation 360 of FIG. 3, the pose estimation apparatus may determine a translation component N and the rotation component by applying δξ N−1 to a translation component N−1 and the rotation component in stage N−1. Hereinafter, operation 360 is also referred to as stage N. Since the change amount of the rotation component included in the δξ N−1 is 0, the rotation component in operation 360 may be identical to the rotation component in stage N−1.

The pose estimation apparatus may verify whether an additional optimization with respect to the translation component is requested in operation 360. Based on a result of the verification that the additional optimization with respect to the translation component in operation 360 is not requested, the pose estimation apparatus may output the translation component N and the rotation component in operation 360 as a pose estimation value.

Figure 4:
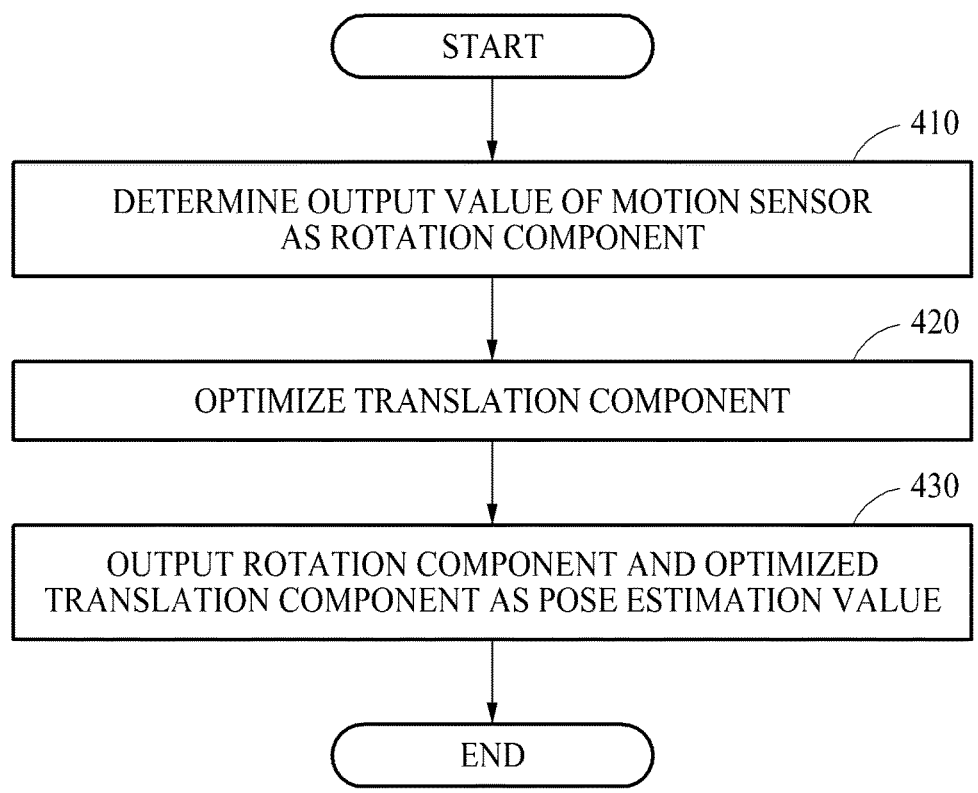
FIG. 4 is a flowchart illustrating an example of a pose estimation method according to an exemplary embodiment.

FIG. 4 is a flowchart illustrating an example of a pose estimation method according to an exemplary embodiment.

The pose estimation method may be performed by a processor included in a pose estimation apparatus.

In operation 410, the pose estimation apparatus determines an output value of a motion sensor as a rotation component. The motion sensor may sense a motion of the pose estimation apparatus and output a result of the sensing. The output value of the motion sensor may include motion information on a rotation angle of the pose estimation apparatus.

In an example, the pose estimation apparatus may verify whether the output value of the motion sensor as the rotation component based on a reliability of the output value of the motion sensor, whether the output value of the motion sensor exists, and an initialization condition of the motion sensor. For example, based on at least one of when the reliability of the output value of the motion sensor is less than a threshold probability, when the output value of the motion sensor does not exist, and when the initialization condition of the motion sensor is incomplete, the pose estimation apparatus may determine not to output the output value of the motion sensor as the rotation component. When the output value of the motion sensor is not determined as the rotation component, the pose estimation apparatus may extract the rotation component from images photographed by a vision sensor. The threshold probability may be predetermined.

In operation 420, the pose estimation apparatus determines a change amount of the translation component based on the rotation component and the translation component extracted from the images photographed by the vision sensor, and optimizes the translation component based on the change amount. The vision sensor may be included in the pose estimation apparatus and may photograph a foreground of the pose estimation apparatus.

Figure 5:
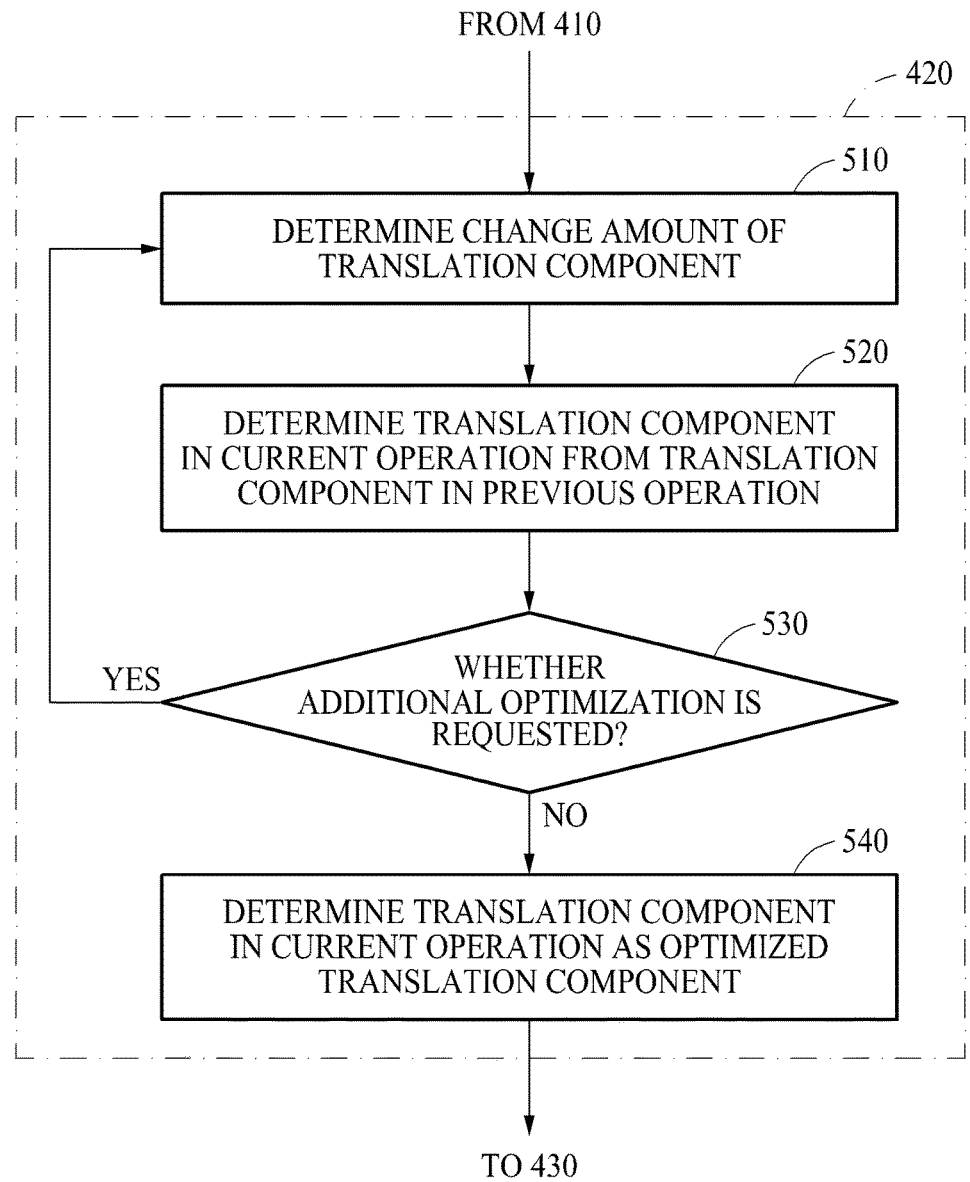
FIG. 5 is a flowchart illustrating an example of determining an optimized translation component according to an exemplary embodiment.

Detailed descriptions of a process of optimizing the translation component will be provided with reference to FIG. 5.

In operation 430, the pose estimation apparatus outputs the rotation component and the optimized translation component as a pose estimation value.

FIG. 5 is a flowchart illustrating an example of determining an optimized translation component according to an exemplary embodiment.

Operation 420 of FIG. 4 includes operations 510 through 540 in FIG. 5.

In operation 510, a pose estimation apparatus determines a change amount of a translation component based on a rotation component and the translation component extracted from images photographed by a vision sensor. Alternatively, the pose estimation apparatus may determine the change amount of the translation component based on a rotation component and a translation component in a previous operation.

In operation 520, the pose estimation apparatus determines a translation component in a current operation from the translation component in the previous operation based on the change amount of the translation component. For example, the pose estimation apparatus may determine the translation component in the current operation based on a sum of the change amount of the translation component and the translation component in the previous operation.

In operation 530, the pose estimation apparatus verifies whether an additional optimization with respect to the translation component in the current operation is requested. For example, the pose estimation apparatus may verify that the additional optimization is not requested when the change amount of the translation component is less than a threshold size and/or when an error rate in the current operation is greater than an error rate in the previous operation.

Based on a result of the verification that the optimization with respect to the translation component in the current operation is requested (operation 530, YES), the pose estimation apparatus may determine the change amount of the translation component based on the rotation component and the translation component in the current operation in operation 510.

Based on a result of the verification that the optimization with respect to the translation component in the current operation is not requested (operation 530, NO), the pose estimation apparatus may determine the translation component in the current operation as an optimized translation component in operation 540.

Figure 6:
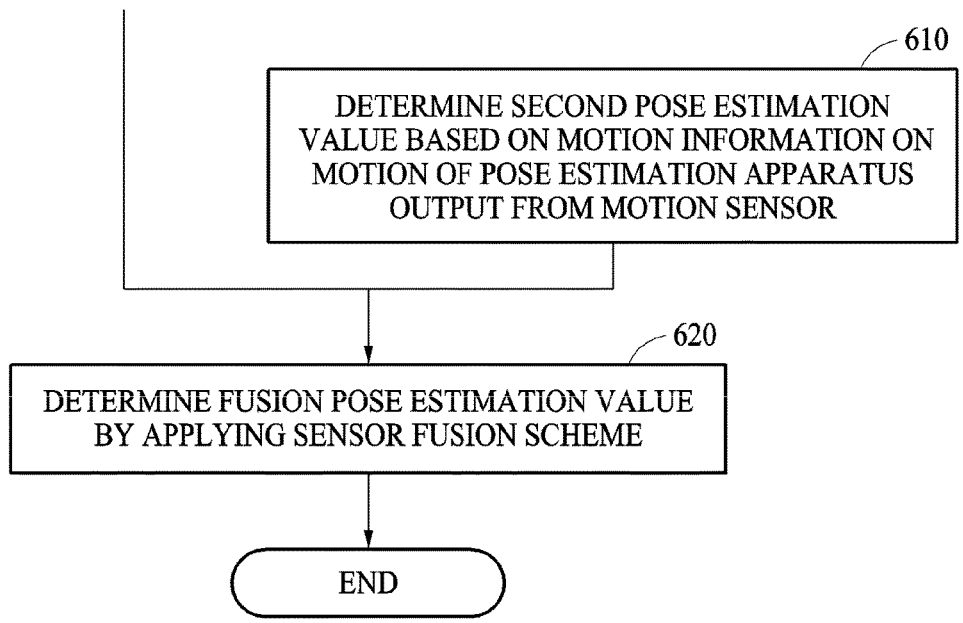
FIG. 6 is a flowchart illustrating an example of determining a fusion pose estimation value by applying a sensor fusion scheme according to an exemplary embodiment.

FIG. 6 is a flowchart illustrating an example of determining a fusion pose estimation value by applying a sensor fusion scheme according to an exemplary embodiment.

FIG. 6 illustrates an example of applying a sensor fusion scheme to a pose estimation value determined based on the pose estimation method of FIG. 4.

For ease of description, the pose estimation value determined based on the pose estimation method described in FIG. 4 is referred to as a first pose estimation value, and a pose estimation value determined in operation 610 is referred to as a second pose estimation value.

In operation 610, the pose estimation apparatus determines a second pose estimation value based on motion information on a motion of the pose estimation apparatus output from a motion sensor. The motion information on the motion of the pose estimation apparatus may include information on a rotation angle and a translation distance of the pose estimation apparatus. The pose estimation apparatus may determine the second pose estimation value based on the motion information on the motion of the pose estimation apparatus through a method generally used in a corresponding technical field.

In operation 620, the pose estimation apparatus determines a fusion pose estimation value by applying the sensor fusion scheme to the first pose estimation value and the second pose estimation value. The sensor fusion scheme is a scheme for combining output values obtained from different sensors to obtain a result value of which accuracy is enhanced over that of an output value of a single sensor. For example, the sensor fusion scheme may include a Kalman filter.

For example, the pose estimation apparatus may determine a reliability with respect to the first pose estimation value and the second pose estimation value using the Kalman filter, and determine the fusion pose estimation value by assigning a Kalman gain to the first pose estimation value and the second pose estimation value based on the determined reliability. The pose estimation apparatus may use the Kalman filter to determine the fusion pose estimation value of which accuracy is enhanced from the first pose estimation value and the second pose estimation value.

Figure 7:
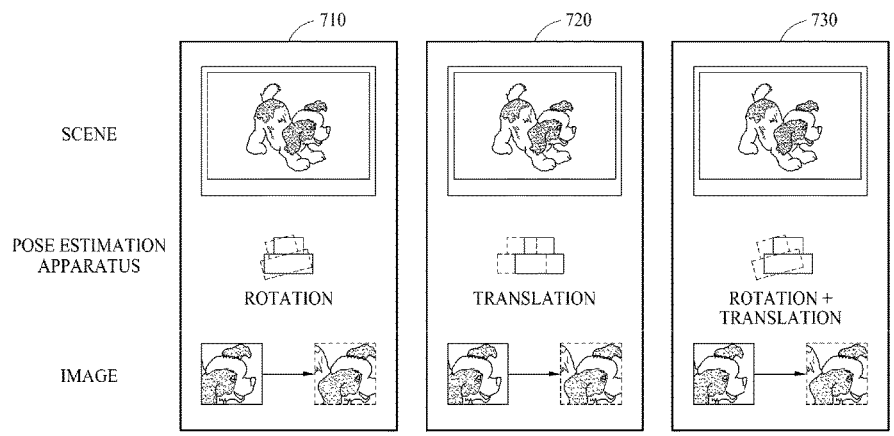
FIG. 7 illustrates examples of an image photographed in a pose estimation apparatus indicating a motion according to an exemplary embodiment.

FIG. 7 illustrates examples of an image photographed by a pose estimation apparatus indicating a motion according to an exemplary embodiment.

For ease of description, FIG. 7 illustrates circumstances in which the pose estimation apparatus moves on an x-axis or rotates on a y-axis. For example, a circumstance in which a translation component Tx toward the x-axis and a rotation component Ry toward the y-axis exist in a motion of the pose estimation apparatus is assumed.

Referring to FIG. 7, in a case 710, the rotation component Ry exists in the motion of the pose estimation apparatus. In a case 720, the translation component Tx exists in the motion of the pose estimation apparatus. In a case 730, the rotation component Ry and the translation component Tx exist in the motion of the pose estimation apparatus.

The pose estimation apparatus illustrated in solid lines indicates a condition before the motion of the pose estimation apparatus occurs, and an image photographed before the motion of the pose estimation apparatus occurs is illustrated in a solid line box. The pose estimation apparatus illustrated in dotted lines indicates a condition after the motion of the pose estimation apparatus occurs, and an image photographed after the motion of the pose estimation apparatus occurs is illustrated in a dotted line box.

As illustrated in FIG. 7, although the cases 710, 720, and 730 represent different motions of the pose estimation apparatus, the different motions may not be distinguishable in images photographed by a vision sensor of the pose estimation apparatus. Thus, although the pose estimation apparatus moves on the x-axis without a rotation, the pose estimation apparatus may output a pose estimation value including a rotation component Ry.

FIG. 8 illustrates an example of optimizing a translation component based on a search space according to an exemplary embodiment.

Referring to FIG. 8, each of search spaces 810 and 820 represents a translation component Tx and a rotation component Ry with respect to a motion of a pose estimation apparatus in a graph, and each of converging areas 811 and 821 in the search spaces 810 and 820 indicates an area in which the translation component Tx and the rotation component Ry are converged through an optimization process. Concisely, the converging areas 811 and 821 may be represented to be a solution set with respect to optimization problems.

In the search space 810, the converging area 811 when the rotation component Ry is not limited is illustrated. As described with reference to FIG. 7, even when the pose estimation apparatus moves on the x-axis without rotation, the translation component Tx having a relatively smaller value than that of an actual translation component Tx and the rotation component Ry may be determined as a pose estimation value due to an error in a target function with respect to the optimization problems. Concisely, even when the pose estimation apparatus moves on the x-axis without rotation, the rotation component Ry may be included in the pose estimation value Conversely, in the search space 820, the converging area 821 when the rotation component Ry is limited to an output value of a motion sensor is illustrated. The pose estimation apparatus may determine the output value of the motion sensor as the rotation component Ry. When the pose estimation apparatus moves on the x-axis without rotation, the rotation component Ry may be set to be 0 corresponding to the output value of the motion sensor. The converging area 821 may have a smaller width than that of the converging area 811 when the rotation component Ry is not limited and optimization may be performed on a translation component based on the optimization process. Thus, when the rotation component Ry is limited to the output value of the motion sensor, the pose estimation value determined based on the optimization process may have a high degree of accuracy.

According to exemplary embodiments, it is possible to determine an output value of a motion sensor as a translation component and determine a highly accurate pose estimation value with respect to a pose estimation apparatus by performing an optimization with respect to a translation component.

According to exemplary embodiments, it is possible to fix the output value of the motion sensor as the rotation component and effectively decrease a width of a converging area in a search space, thereby enhancing pose estimation performance.

According to exemplary embodiments, it is possible to effectively enhance accuracy in the pose estimation value with respect to the pose estimation apparatus by applying a sensor fusion scheme, for example, a Kalman filter, to the pose estimation value determined based on the rotation component corresponding to the output value of the motion sensor.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described exemplary embodiments may be recorded in non-transitory computer-readable media including program instructions to implement various operations of the above-described exemplary embodiments. The media may also include, alone or in combination with the program instructions, data files, data structures, and the like. The program instructions recorded on the media may be those specially designed and constructed for the purposes of exemplary embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described exemplary embodiments, or vice versa.

A number of exemplary embodiments have been described above. Nevertheless, it should be understood that various modifications may be made to these exemplary embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pose estimation method performed by a pose estimation apparatus, the method comprising:
    determining, as a rotation component, an output value of a motion sensor configured to sense a motion of the pose estimation apparatus;
    determining a change amount of a translation component based on the rotation component, and the translation component extracted from images photographed by a vision sensor included in the pose estimation apparatus, and optimizing the translation component based on the change amount; and
    outputting the rotation component and the optimized translation component as a pose estimation value of the pose estimation apparatus,
    wherein the rotation component is constantly maintained to be the output value of the motion sensor while the translation component is optimized.

2. The method of claim 1, wherein the output value of the motion sensor comprises motion information on a rotation angle of the pose estimation apparatus.

3. The method of claim 1, wherein a change amount of the rotation component is set to be 0, or a rotation component of a Jacobian matrix used to determine the change amount of the translation component is set to be 0.

4. The method of claim 1, wherein the optimizing of the translation component comprises:
    determining the change amount of the translation component based on the rotation component and the translation component in a previous operation, and determining a translation component in a current operation from the translation component in the previous operation based on the change amount of the translation component;
    verifying whether additional optimization with respect to the translation component in the current operation is requested; and
    determining the translation component in the current operation as the optimized translation component when the additional optimization with respect to the translation component in the current operation is not requested.

5. The method of claim 4, wherein the verifying comprises:
    verifying that the additional optimization is not requested when the change amount of the translation component is less than a threshold amount, or when an error rate in the current operation is greater than an error rate in the previous operation.

6. The method of claim 1, further comprising:
    determining the output pose estimation value, and
    determining a fusion pose estimation value of the pose estimation apparatus by applying a sensor fusion scheme with respect to the pose estimation value of the pose estimation apparatus determined based on motion information on the motion of the pose estimation apparatus output from the motion sensor.

7. The method of claim 1, wherein the determining of the output value of the motion sensor as the rotation component comprises:
    verifying whether the output value of the motion sensor is determined as the rotation component based on at least one of a reliability of the output value of the motion sensor, whether the output value of the motion sensor exists, and an initialization condition of the motion sensor.

8. The method of claim 1, wherein the vision sensor is:
    an event-based vision sensor configured to asynchronously generate an event signal in response to an event in which a light received from an object is changed; or
    a frame-based vision sensor configured to synchronously photograph the object according to a number of frames per second.

9. The method of claim 1, wherein the translation component comprises information on a translation distance of the pose estimation apparatus based on an x-axis, a y-axis, and a z-axis, and the rotation component comprises information on a rotation angle of the pose estimation apparatus based on the x-axis, the y-axis, and the z-axis.

10. A non-transitory computer-readable recording medium which stores a program to implement the method of claim 1.

11. A pose estimation apparatus comprising:
a motion sensor configured to sense a motion of the pose estimation apparatus;
a vision sensor configured to photograph a foreground of the pose estimation apparatus; and
a processor configured to estimate a pose of the pose estimation apparatus,
wherein the processor is configured to determine, as a rotation component, an output value of the motion sensor, determine a change amount of a translation component based on the rotation component, and the translation component extracted from images photographed by the vision sensor, optimize the translation component based on the change mount, and output the rotation component and the optimized translation component as a pose estimation value of the pose estimation apparatus,
wherein the rotation component is constantly maintained to be the output value of the motion sensor while the translation component is optimized.

12. The apparatus of claim 11, wherein the output value of the motion sensor comprises motion information on a rotation angle of the pose estimation apparatus.

13. The apparatus of claim 11, wherein the processor is configured to determine the change amount of the translation component based on the rotation component and a translation component in a previous operation, determine a translation component in a current operation from the translation component in the previous operation, verify whether additional optimization with respect to the translation component in the current operation is requested, and determine the translation component in the current operation as the optimized translation component when the additional optimization with respect to the translation component is not requested.

14. The apparatus of claim 13, wherein the processor is configured to verify that the additional optimization is not requested when the change amount of the translation component is less than a threshold amount, or when an error rate in the current operation is greater than an error rate in the previous operation.

15. The apparatus of claim 11, wherein the processor is configured to determine the output pose estimation value and a fusion pose estimation value of the pose estimation apparatus by applying a sensor fusion scheme with respect to the pose estimation value of the pose estimation apparatus determined based on motion information on the motion of the pose estimation apparatus output from the motion sensor.

16. The apparatus of claim 11, wherein the processor is configured to verify whether the output value of the motion sensor is determined as the rotation component based on at least one of a reliability of the output value of the motion sensor, whether the output value of the motion sensor exists, and an initialization condition of the motion sensor.

17. The apparatus of claim 11, wherein the vision sensor is:
an event-based vision sensor configured to asynchronously generate an event signal in response to an event in which a light received from an object is changed; or
a frame-based vision sensor configured to synchronously photograph the object according to a predetermined number of frames per second.

18. A pose estimation method performed by a pose estimation apparatus, the method comprising:
in a first stage, setting a rotation angle from a motion sensor of the pose estimation apparatus, as a rotation component of a pose of the pose estimation apparatus, and determining a change amount of a plurality of images from a vision sensor of the pose estimation apparatus, as a translation component of a pose of the pose estimation apparatus;
in one or more subsequent stages, iteratively optimizing the translation component based on a translation component from a prior stage, while holding a change amount of the rotation component constant; and
outputting the rotation component and the optimized translation component of the pose of the pose estimation apparatus.

* * * * *